(12) United States Patent
Forssen et al.

(10) Patent No.: US 10,937,597 B2
(45) Date of Patent: Mar. 2, 2021

(54) HIGH VOLTAGE CAPACITIVE DEVICE

(71) Applicant: ABB Schweiz AG, Baden (CH)

(72) Inventors: Cecilia Forssen, Västerås (SE); Francisco Penayo, Soderbarke (SE); Joachim Schiessling, Enköping (SE); Nils Lavesson, Västerås (SE); Peter Sjöberg, Ludvika (SE); Roger Hedlund, Ludvika (SE); Ylva Granbom, Falun (SE); Peter Dyreklev, Norrköping (SE); Staffan Nordlinder, Norrköping (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/626,210

(22) PCT Filed: Jun. 19, 2018

(86) PCT No.: PCT/EP2018/066231
§ 371 (c)(1),
(2) Date: Dec. 23, 2019

(87) PCT Pub. No.: WO2019/002019
PCT Pub. Date: Jan. 3, 2019

(65) Prior Publication Data
US 2020/0126732 A1 Apr. 23, 2020

(30) Foreign Application Priority Data
Jun. 30, 2017 (EP) .................................. 17179054

(51) Int. Cl.
H01G 4/32 (2006.01)
H01G 4/012 (2006.01)
H01G 4/18 (2006.01)

(52) U.S. Cl.
CPC ............... *H01G 4/32* (2013.01); *H01G 4/012* (2013.01); *H01G 4/18* (2013.01)

(58) Field of Classification Search
CPC ........ H01G 4/306; H01G 4/008; H01G 4/015; H01G 4/30; H01G 4/32; H01G 4/012; H01G 4/18
See application file for complete search history.

(56) References Cited

U.S. PATENT DOCUMENTS 3,513,253 A 5/1970 Woods
5,136,462 A * 8/1992 Steiner .................. H01G 4/015
361/273

(Continued)

FOREIGN PATENT DOCUMENTS

CN 2575813 Y 9/2003
CN 101601108 A 12/2009

(Continued)

OTHER PUBLICATIONS

Extended European Search Report Application No. EP 17 17 9054 Completed: Dec. 12, 2017; dated Dec. 20, 2017 9 pages.

(Continued)

*Primary Examiner* — Michael P Mcfadden
(74) *Attorney, Agent, or Firm* — Sage Patent Group

(57) ABSTRACT

A high voltage capacitive device having: a non-impregnatable film having a plurality of physically separated regions each defined by a conductive coating provided on the non-impregnatable film, wherein the non-impregnatable film is wound in a plurality of turns to form a plurality of layers, wherein the regions are arranged in overlapping layers in the radial direction, wherein the non-impregnatable film forms a dielectric between adjacent layers of the regions, and wherein the conductive coating of at least some of the regions is provided with a plurality of first radial openings extending through the conductive coating to the (Continued)

non-impregnatable film, which delimits a radial extension of each first radial opening.

15 Claims, 4 Drawing Sheets

(56) References Cited

U.S. PATENT DOCUMENTS

| | | | |
|---|---|---|---|
| 6,251,503 B1 | 6/2001 | Momose | |
| 2009/0014211 A1 | 1/2009 | Tilliette et al. | |
| 2009/0268368 A1* | 10/2009 | Fuhrmann | H01G 4/32 361/301.5 |
| 2015/0303002 A1* | 10/2015 | Yun | H01G 9/02 361/502 |

FOREIGN PATENT DOCUMENTS

| | | |
|---|---|---|
| CN | 103534766 A | 1/2014 |
| CN | 105144308 A | 12/2015 |
| CN | 105355344 A | 2/2016 |
| DE | 19547120 A1 | 6/1997 |
| EP | 2093777 A1 | 8/2009 |
| WO | 2007071096 A1 | 6/2007 |
| WO | 2015124656 A1 | 8/2015 |

OTHER PUBLICATIONS

International Preliminary Report on Patentability Application No. PCT/EP2018/066231 Completed: May 23, 2019; dated May 23, 2019 14 pages.
International Search Report and Written Opinion of the International Searching Authority Application No. PCT/EP2018/066231 Completed: Jul. 25, 2018; dated Aug. 2, 2018 14 pages.
Search Report dated Jun. 15, 2020 for Chinese Patent Application No. 2018800411630, 2 pages.

* cited by examiner

HIGH VOLTAGE CAPACITIVE DEVICE

TECHNICAL FIELD

The present disclosure generally relates to high voltage electrical equipment. In particular, it relates to a high voltage capacitive device comprising a non-impregnatable film.

BACKGROUND

Bushings, cable terminations, instrument transformer and capacitors are examples of capacitive devices.

Bushings are used for leading a high voltage conductor through a medium which has a different electric potential than the high voltage conductor. In the case of a bushing for example, a high voltage conductor is lead through a wall having a different potential. The dimensions of high voltage electrical equipment at the interface between the high voltage conductor and the medium may thereby be kept smaller than would otherwise be possible.

In order to obtain a controlled distributed electric field along the bushing body, the bushing may comprise a capacitive field grading arrangement, i.e. a condenser core. This arrangement comprises a plurality of conductive layers electrically insulated from each other and extending longitudinally along the bushing body forming coaxial cylinders. In order to improve the electrical withstand strength, the axial length of each conductive layer is shorter than that of the corresponding insulation layers between which a conductive layer is sandwiched.

Traditionally, the condenser core has been made of cellulose-based material such as paper which define the insulating layers and aluminum foils arranged along regions of the cellulose-based material and which define the conductive layers. The cellulose-based material and aluminum foils are wound together around a conductor. The cellulose-based material is then dried, and in a subsequent step the arrangement is subjected to impregnation by means of epoxy impregnation in a vacuum chamber. Finally, the epoxy is cured and the solid condenser core is thus obtained.

Utilizing cellulose-based material as base for the condenser core body may thus be cumbersome and requires a plurality of manufacturing steps in order to obtain a lead-through device.

WO2007/071096 discloses a bushing which has a condenser core that instead of a cellulose-based material comprises polymer film which has been metalized by means of vapor deposition to thereby obtain conductive layers. As a result thinner conductive layers than what is possible by means of e.g. aluminum foil can be obtained. Utilizing a polymer film instead of cellulose-based material is advantageous in that the drying step may be much easier or even discarded in the manufacturing process. By obtaining thinner conductive layer air pockets at the ends of the conductive layers created between the films sandwiching each conductive layer become thinner/smaller.

Metallization applied by vapor deposition on polymer film however tend to evaporate in the presence of partial discharge. For bushings, where partial discharge is most likely at the edges of the conductive layers, this would mean that the conductive layers would be consumed slowly resulting in less advantageous electrical field distribution along the bushing body.

An improvement in this regard was presented in WO2015124656, which discloses high voltage lead-through device comprising a conductor, and a polymer film wound around the conductor thus forming a condenser core, wherein the polymer film has a surface comprising a plurality of regions provided with a conductive compound. Each region provided with the conductive compound forms a respective conductive layer of the condenser core.

Capacitive devices may be exposed to very fast transients. Existing capacitive device may not be able to handle fast transients optimally. Moreover, even when a conductive compound is used as a conductive layer the manufacturing process takes a relatively long time.

US 2009/014211 A1 discloses a high-voltage bushing which has a conductor and a core surrounding the conductor, wherein the core comprises a sheet-like spacer, which spacer is impregnated with an electrically insulating matrix material.

EP 2 093 777 A1 discloses a bushing for a main conductor comprising a number n of foils of electrically conductive material provided spaced from each other around an elongated volume stretching through the bushing and provided for the main conductor, and a mechanical fastening and electrical grounding body encircling the foils and being provided with a measurement opening.

SUMMARY

An object of the present disclosure is to provide a high voltage capacitive device which solves or at least mitigates existing problems of the state of the art.

There is hence provided a high voltage capacitive device comprising: a non-impregnatable film having a plurality of physically separated regions each defined by a conductive coating provided on the non-impregnatable film, wherein the non-impregnatable film is wound in a plurality of turns to form a plurality of layers, wherein the regions are arranged in overlapping layers in the radial direction, wherein the non-impregnatable film forms a dielectric between adjacent layers of the regions, and wherein the conductive coating of at least some of the regions is provided with a plurality of radial first radial openings extending through the conductive coating to the non-impregnatable film, which delimits a radial extension of each first radial opening.

The first radial openings hence extend through the conductive coating only and not through the non-impregnatable film.

The capacitive device may thereby provide better attenuation of very fast transients. The attenuation of voltage transients is determined by the resistance and inductance of the conductive layer, in the present case the conductive coating. By providing a plurality of first radial openings in the conductive coating, the resistance and inductance can be altered. Thereby, a capacitive device design which is more robust against very fast transients may be provided.

The cross-sectional area of the first radial openings may be different for different regions and thus for different layers of the wound non-impregnatable film. Transient voltages at different frequencies may thereby be attenuated.

The existence of the first radial openings also reduces the coating material volume necessary to manufacture the high voltage capacitive device. This reduction of coating material reduces the costs as well as shortens the time for drying/curing. This speeds up the coating process and saves the non-impregnatable film from potentially harmful drying/curing treatment.

By non-impregnatable is meant that the non-impregnatable film will not absorb any impregnation, for example a resin, if it would be subjected thereto.

According to one embodiment the non-impregnatable film has a dielectric side and a conductive coating side, wherein for each turn having a region provided with conductive coating the conductive coating side bears against the dielectric side of another turn of the wound non-impregnatable film.

According to one embodiment the radially outermost region is continuously coated in a non-patterned manner.

According to one embodiment the radially innermost region is continuously coated in a non-patterned manner.

According to one embodiment the first radial openings have a rounded or polygonal cross-sectional shape. The corners of the first radial openings, in cross-section, may for example be rounded.

According to one embodiment each region has axial edge areas, wherein the axial edge areas are continuously coated in a non-patterned manner. Each axial edge area forms part of the boundary of the corresponding region. Each axial edge area may have a surface extension from a first radial opening bordering the axial edge area to the edge of the axial edge area, which is greater than the distance between any adjacent first radial openings of the region. To this end, the width of an axial edge area may be greater than the distance between two adjacent first radial openings.

According to one embodiment the high voltage capacitive device consists of the wound non-impregnatable film.

According to one embodiment the first radial openings of a region form a first pattern.

According to one embodiment the conductive coating of at least some of the regions is provided with a plurality of second radial openings extending through the conductive coating to the non-impregnatable film, which delimits a radial extension of each second radial opening, wherein the second radial openings form a second pattern.

According to one embodiment at least one region is provided with the first radial openings forming the first pattern and with the second radial openings forming the second pattern.

According to one embodiment the second radial openings have a rounded or polygonal cross-sectional shape. The corners of the second radial openings, in cross-section, may for example be rounded.

According to one embodiment the first pattern and the second pattern are mutually different.

According to one embodiment the first radial openings are smaller than a radial distance between two adjacent layers of regions provided with a conductive coating.

According to one embodiment the non-impregnatable film is a polymer film.

According to one embodiment the conductive coating is a conductive compound.

According to one embodiment the high voltage capacitive device is one of a condenser bushing, a cable termination, a capacitor and an instrument transformer. In the case of a condenser bushing, the non-impregnatable film may form the condenser core.

Generally, all terms used in the claims are to be interpreted according to their ordinary meaning in the technical field, unless explicitly defined otherwise herein. All references to "a/an/the element, apparatus, component, means, etc.," are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
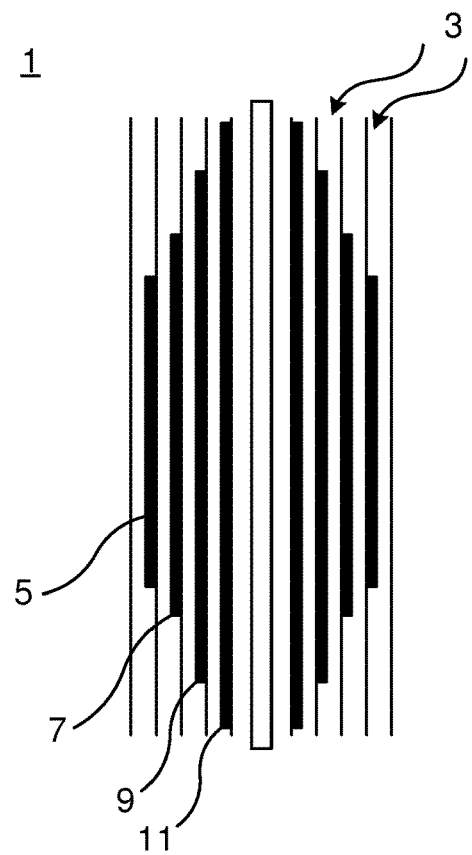
FIG. 1 schematically depicts a longitudinal section of a high voltage capacitive device in the form of a condenser bushing.

FIG. 1 shows an example of a high voltage capacitive device 1 comprising a non-impregnatable film 3. The exemplified high voltage capacitive device 1 is a condenser bushing for a transformer or a reactor, but it should be noted that the description relating to the non-impregnatable film generally also applies to instrument transformers and cable terminations, in particular cable terminations having a wound film structure, as well.

The non-impregnatable film 3 has been wound a plurality of turns to form the high voltage capacitive device 1. The non-impregnatable film 3 is provided with a plurality of physically separated regions 5, 7, 9, 11, each defined by a conductive coating or conductive layer provided on the non-impregnatable film 3. The regions 5, 7, 9, 11 are electrically insulated from each other but are capacitively coupled.

The non-impregnatable film 3 has a dielectric side and a conductive coating side. The dielectric side is that side of the non-impregnatable film which is not provided with any conductive coating. In the wound state shown in FIG. 1, the conductive coating of each region 5, 7, 9, 11 bears against the dielectric side of an adjacent turn of the non-impregnatable film 3. A capacitive coupling between the regions is thus obtained.

The non-impregnatable film 3 may for example be made of polymer e.g. a thermoplastic film, a pre-impregnated material such as a cellulose-based material e.g. paper, pre-impregnated fiberglass web, or glass. In particular, the non-impregnatable film 3 should be made of a material or a material combination which is able to withstand elevated temperatures caused for example by the high currents in the apparatus conductor. The thickness of the non-impregnatable film 3 may for example be in the range 1-250 µm.

Figure 2:
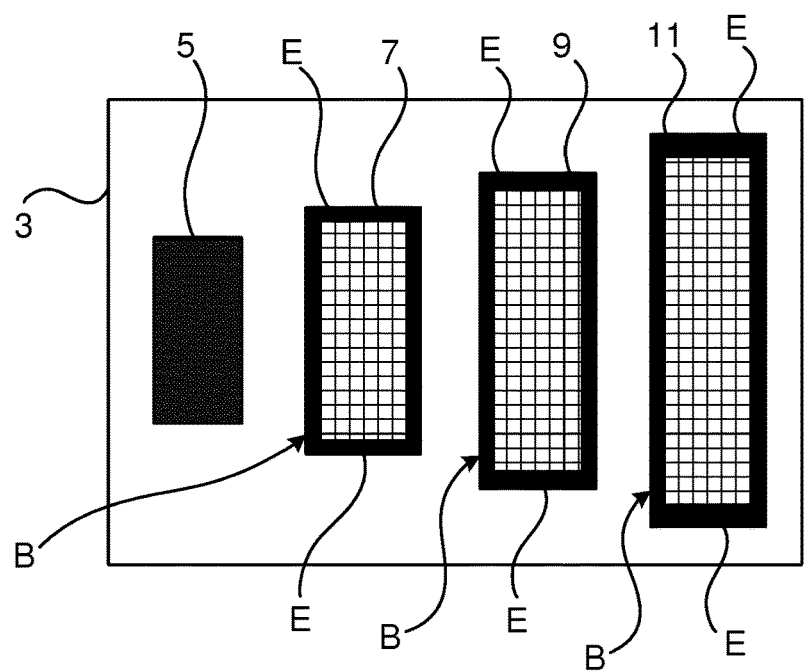
FIG. 2 is a schematic top view of a non-impregnatable film prior to being wound to form a high voltage capacitive device.

Turning now to FIG. 2, the exemplified non-impregnatable film 3 is shown in a non-wound state, as a sheet. As can be understood in conjunction with FIG. 1, the area defined by a respective one of the regions 5, 7, 9, 11 become smaller and smaller in a radially outwards direction of the high voltage capacitive device 1.

The regions 5, 7, 9, 11 may have a plurality of different shapes. The regions 5, 7, 9, 11 may for example be rectangular, as shown in FIG. 2 and in FIGS. 4a and 4b. Some of the regions 5, 7, 9, 11 are provided with radial openings. According to the example shown in FIG. 2, regions 7, 9 and 11 are provided with radial openings. Moreover, each region 7, 9 and 11 has an axial edge area E. The axial edge area E of each region 7, 9, 11 forms part of the boundary B of the region 7, 9, 11 in question. The axial edge areas E are not provided with any radial openings, and are thus continuously coated. In general, the boundary of each region 7, 9, 11 that is not the radially outermost region, and in some examples also the radially innermost region, is not provided with any radial openings, and each boundary is thus continuously coated.

Each section of the boundary B is parallel to the corresponding edge of the non-impregnatable film 3. For example an axially extending boundary portion is parallel with the axial edge or symmetry axis of the non-impregnatable film 3 and a transverse boundary portion is parallel with the corresponding transverse edge of the non-impregnatable film 3.

Figure 3:
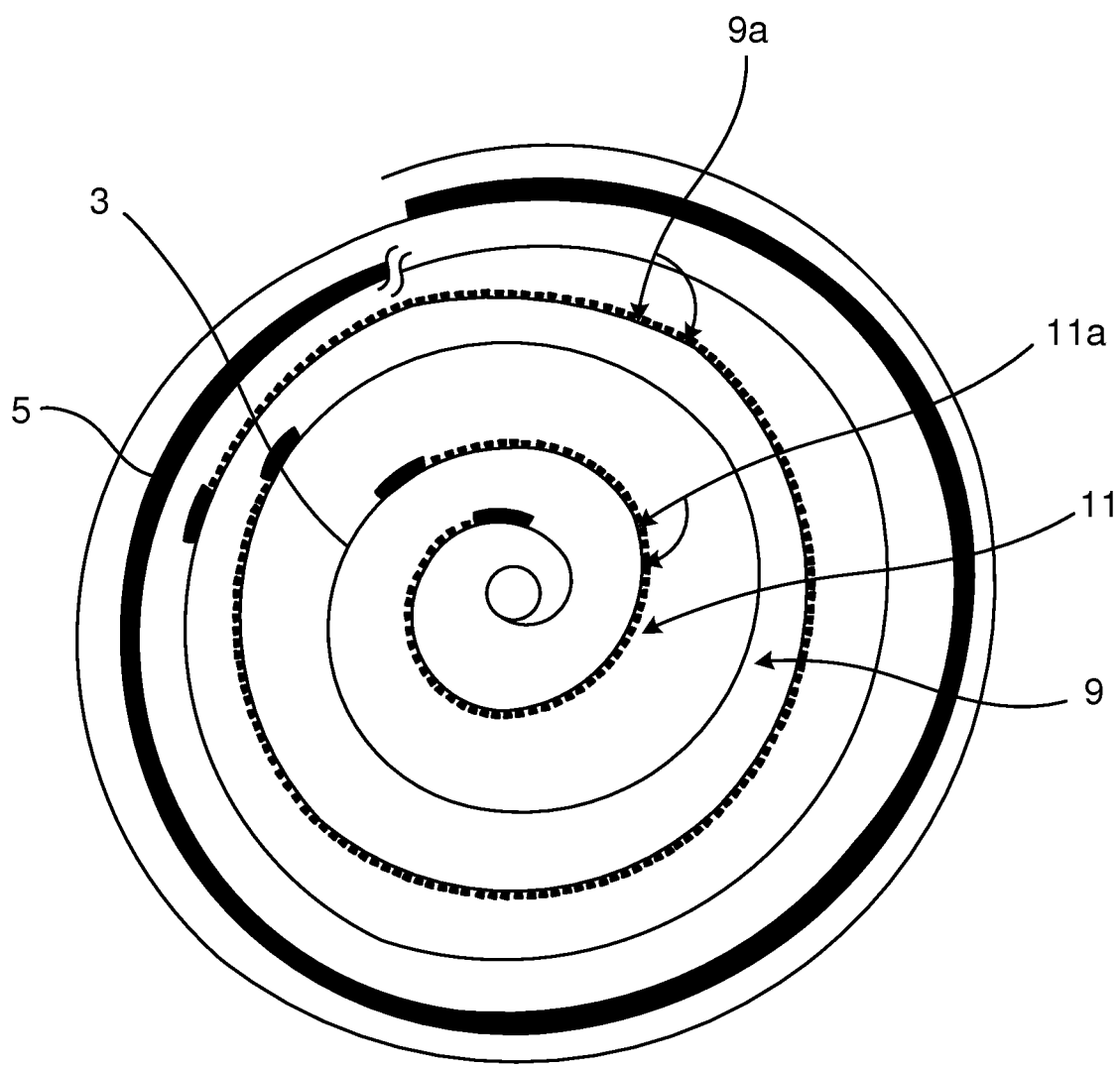
FIG. 3 schematically shows a cross-section of a high voltage capacitive device.

FIG. 3 schematically shows a cross-sectional view of a high voltage device 1. The radially outermost region 5 is continuously coated, and is hence non-patterned. In the following, by "inner regions" is meant any region which is not the radially outermost region of a conductive coating provided on the non-impregnatable film 3. Inner regions 9 and 11, shown in FIG. 3 are provided with a plurality of radial openings 9a, 11a. The radial openings form patterns in the regions 9 and 11. For example, the region 9 comprises a plurality of first radial openings 9a and the region 11 comprises a plurality of second radial openings 11a. The first radial openings 9a extend radially through the conductive coating defining the region 9 until reaching the non-impregnatable film 3. The non-impregnatable film 3 hence delimits the radial extension of the first radial openings 9a. The non-impregnatable film 3 thus defines an end, and terminates each first radial opening 9a.

Similarly, the second radial openings 11a extend through the conductive coating defining the region 11 until reaching the non-impregnatable film 3. The non-impregnatable film 3 hence delimits the radial extension of the second radial openings 11a. The non-impregnatable film 3 hence defines an end, and terminates each second radial opening 11a.

According to one example each region 7, 9, 11 except the radially outermost region 5 is provided with radial openings 9a, 11a. The inner regions 7, 9, 11 are thus provided with radial openings defining one or more patterns in the respective region. According to one example the radially innermost region is also continuously coated, i.e. without radial openings.

A radial opening of any region 7, 9, 11 is preferably smaller in cross-sectional dimension than the radial distance from a radial opening to the most closely located region of conductive coating of an adjacent layer or turn of the non-impregnatable film 3.

Figure 4A:
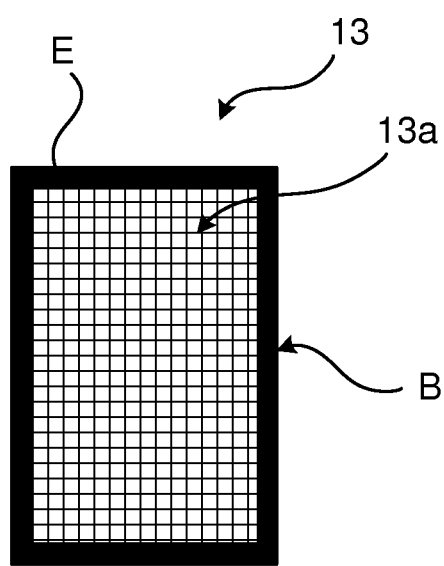
FIGS. 4a and 4b show two examples of a region of conductive coating.
Figure 4B:
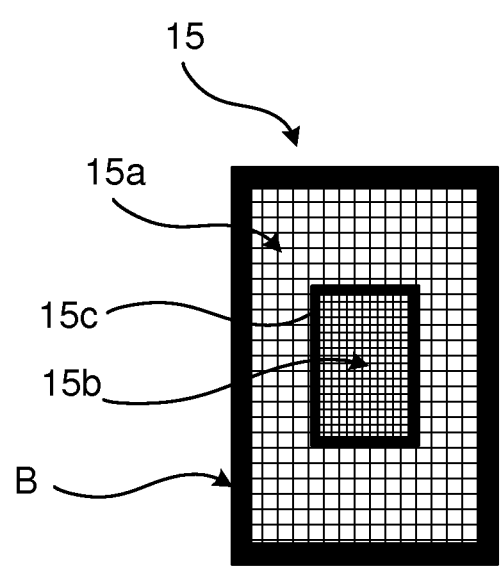

FIGS. 4a and 4b show two examples of shapes of the regions of conductive coating and patterning of their interior. In FIG. 4a, a region 13 of conductive coating which is rectangular is shown. The axial edge area E as well as the entire boundary B is continuously coated with the conductive coating. The interior of the region 13 is provided with a pattern formed by radial openings 13a extending to non-impregnatable film onto which the region 13 is printed. According to the example, each radial opening 13a is identical. It is however envisaged that a single region may be provided with different types of radial openings, for example first radial openings having a first shape and forming a first pattern, and second radial openings having a second shape and forming a second pattern.

FIG. 4b shows an example of a region 15 of a conductive coating which is provided with two different patterns formed by differently shaped radial openings. With shape is generally meant the cross-sectional shape of the radial openings. The boundary B of the region 15 is provided with a continuous conductive coating. The boundary B does hence not have any radial openings. The region 15 is provided with first radial openings 15a inside the boundary B. The first radial openings 15a form a first pattern. The first pattern surrounds a second pattern formed by second radial openings 15b which have a different shape than the first radial openings 15a. There is also provided a non-patterned boundary 15c which separates the first radial openings 15a from the second radial openings 15b.

In general, different patterns of a region may be formed by differently shaped radial openings and/or differently sized radial openings.

Figure 5A:
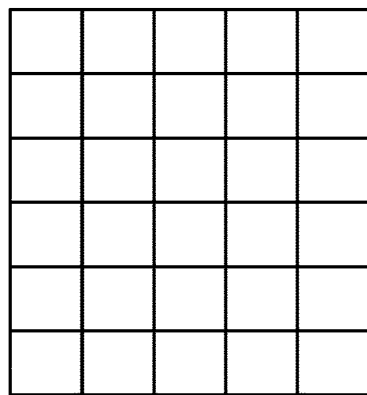
FIGS. 5a-5c show examples of various patterns of radial openings.
Figure 5B:
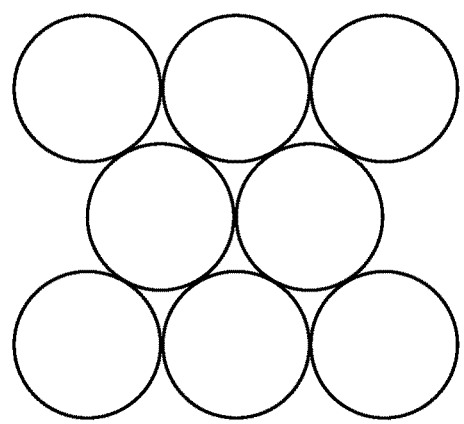
Figure 5C:
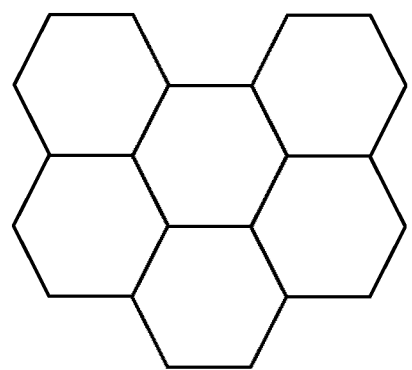

FIGS. 5a-5c show some examples of shapes and configurations of the radial openings. In the example in FIG. 5a, the radial openings have a rectangular cross-sectional shape. In the example in FIG. 5b, the radial openings have a circular cross-sectional shape. The radial openings could alternatively have an elliptical shape for example. FIG. 5c shows an example where the radial openings have a polygonal shape. In the example, the polygonal shape is hexagonal.

Some of the regions may have mutually different patterns. For example, one region may have radial openings which are smaller than the radial openings of another region. Alternatively, or additionally, the cross-sectional shape of the radial openings of the conductive coating in two regions may differ. Depending on the design different patterning provides attenuation of different transient frequencies.

When the high voltage capacitive device is being manufactured, the non-impregnatable film 3 is coated with a conductive compound, such as conductive ink or conductive polymer. Since the film 3 is non-impregnatable, it cannot absorb the conductive compound. The conductive compound is thus arranged on the surface, in a number of regions, of the non-impregnatable film 3.

The invention claimed is:

1. A high voltage capacitive device comprising:
   a non-impregnatable film having a plurality of physically separated regions each defined by a conductive coating provided on the non-impregnatable film,
   wherein the non-impregnatable film is wound in a plurality of turns to form a plurality of layers, wherein the regions are arranged in overlapping layers in the radial direction,
   wherein the non-impregnatable film forms a dielectric between adjacent layers of the regions, and
   wherein the conductive coating of at least some of the regions is provided with a plurality of first radial openings extending through the conductive coating to the non-impregnatable film, which delimits a radial extension of each first radial opening,
   wherein each region is encompassed within a boundary comprising axial edge areas, wherein the boundary comprising the axial edge areas is continuously coated in a non-patterned manner,
   wherein at least one region is provided with first radial openings forming a first pattern and a plurality of second radial openings extending through the conductive coating to the non-impregnatable film, which delimits a radial extension of each second radial opening, and wherein the second radial openings forming a second pattern different from the first pattern, wherein the first pattern surrounds the second pattern within the at least one region.

2. The high voltage capacitive device as claimed in claim 1, wherein the non-impregnatable film has a dielectric side and a conductive coating side, wherein for each turn having a region provided with conductive coating the conductive coating side bears against the dielectric side of another turn of the wound non-impregnatable film.

3. The high voltage capacitive device as claimed in claim 1, wherein the radially outermost region is continuously coated in a non-patterned manner.

4. The high voltage capacitive device as claimed in claim 1, wherein the first radial openings have a rounded or polygonal cross-sectional shape.

5. The high voltage capacitive device as claimed in claim 1, wherein the high voltage capacitive device consists of the wound non-impregnatable film.

6. The high voltage capacitive device as claimed in claim 1, wherein the second radial openings have a rounded or polygonal cross-sectional shape.

7. The high voltage capacitive device as claimed in claim 1, wherein the first radial openings are smaller than a radial distance between two adjacent layers of regions provided with a conductive coating.

8. The high voltage capacitive device as claimed in claim 1, wherein the non-impregnatable film is a polymer film.

9. The high voltage capacitive device as claimed in claim 1, wherein the conducting coating is a conductive compound.

10. The high voltage capacitive device as claimed in claim 1, wherein the high voltage capacitive device is one of a condenser bushing, a cable termination, a capacitor and an instrument transformer.

11. The high voltage capacitive device as claimed in claim 1, wherein a boundary of the at least one region comprises a first boundary and a second boundary, the first pattern comprised within the first boundary and the second pattern comprised within the second boundary; and wherein the first boundary and the second boundary are continuously coated with the conductive coating in a non-patterned manner.

12. The high voltage capacitive device as claimed in claim 11, wherein the second boundary is surrounded by the first pattern comprised within the first boundary of the at least one region.

13. A non-impregnatable high voltage capacitive film configured to be wound in a plurality of turns to form a plurality of layers, the non-impregnatable high voltage capacitive film comprising:

a plurality of physically separated regions each defined by a conductive coating provided on the non-impregnatable film, wherein the plurality of physically separated regions are arranged in overlapping layers in the radial direction and the non-impregnatable film forms a dielectric between adjacent layers of the regions when the non-impregnatable high voltage capacitive film is wound;

a plurality of first radial openings extending through the conductive coating of at least some of the regions provided on the non-impregnatable film, which delimits a radial extension of each first radial opening;

a plurality of boundaries each encompassing a region of the plurality of physically separate regions, wherein each boundary comprises axial edge areas, wherein each boundary comprising the axial edge areas is continuously coated in a non-patterned manner;

a plurality of second radial openings extending through the conductive coating to the non-impregnatable film, wherein the non-impregnatable film delimits a radial extension of each second radial opening, wherein the first radial openings of a region form a first pattern and the second radial openings form a second pattern different from the first pattern; and wherein at least one region of the plurality of regions comprises the first radial openings forming the first pattern and with the second radial openings forming the second pattern, wherein the first pattern surrounds the second pattern within the at least one region.

14. The non-impregnatable high voltage capacitive film of claim 13, wherein the non-impregnatable film has a dielectric side and a conductive coating side, wherein for each turn having a region provided with conductive coating the conductive coating side bears against the dielectric side of another turn of the wound non-impregnatable film.

15. The non-impregnatable high voltage capacitive film of claim 13, wherein the at least one region comprises a first boundary and a second boundary of the plurality of boundaries, the first pattern comprised within the first boundary and the second pattern comprised within the second boundary; and wherein the second boundary is surrounded by the first pattern comprised within the first boundary of the at least one region.

* * * * *